United States Patent [19]
Baboian

[11] 3,900,375

[45] Aug. 19, 1975

[54] ELECTROLYTIC SEPARATION OF METALS

[75] Inventor: Robert Baboian, North Attleboro, Mass.

[73] Assignee: Texas Instruments Incorporated, Dallas, Tex.

[22] Filed: Dec. 13, 1973

[21] Appl. No.: 424,526

[52] U.S. Cl. ................................. 204/140; 204/146
[51] Int. Cl.² ........................ C25F 1/00; C25F 5/00
[58] Field of Search ............................. 204/146, 140

[56] References Cited
UNITED STATES PATENTS
3,826,724   7/1974   Riggs, Jr. et al. .................. 204/146

*Primary Examiner*—T. M. Tufariello
*Attorney, Agent, or Firm*—James P. McAndrews; John A. Haug; Russell E. Baumann

[57] ABSTRACT

A process for separating a first metal from a composite metal body in which said first metal is adhered as an external layer over a substrate constituted by a second metal. The body is immersed in an electrolytic solution in which the two metals are subject to differential anodic dissolution at a predetermined anode voltage measured by reference to a standard electrode, with the degree of dissolution of the second metal in the half-cell comprising the second metal and the solution being substantially less than the degree of dissolution of the first metal in the half-cell comprising the first metal and the solution at that voltage. Direct current is supplied to the body from the positive terminal of a direct current power source whose negative terminal is connected to a cathode also immersed in the solution. The voltage of the anode is controlled relative to the standard electrode at a level which maintains the aforesaid differential dissolution and thereby causes selective removal of the first metal from the body.

9 Claims, 3 Drawing Figures

ELECTROLYTIC SEPARATION OF METALS

BACKGROUND OF THE INVENTION

This invention relates to the electrolytic separation of metals and, more particularly, to an improved method for selectively removing an external metal layer of a metal composite body by controlled potential electrolysis.

Metal laminates or composites are widely used in a variety of different industrial and commercial applications. To produce such composites, a coating or cladding of one metal is applied to a substrate constituted by a different metal using various techniques, including vapor deposition, roll bonding, electroplating, etc. Both in the coating or cladding processes and in the fabrication of metal products from the metal composite stock, some amount of off-grade or scrap composite metal is inevitably produced. To conserve raw materials and minimize the cost of both the composite metal and products produced therefrom, it is highly desirable to recover the components of the scrap composite and reuse these components in further coating or cladding operations. Recovery of the scrap necessarily involves separation of the external layer of metal from the substrate metal. One technique which has been used commercially to accomplish this separation is vaporization of one of the metals, normally that constituting the coating or cladding. Vaporization techniques, however, require high temperatures and careful collection of vapors to avoid loss of metal vapor to the surroundings, a consideration which may be especially critical where the cladding metal is expensive, toxic or both. Vaporization recovery techniques have generally proved to be both costly and inefficient.

Chemical separation methods have also been used in the art to remove metal coatings or claddings from a substrate. Chemical separations are frequently unattractive, however, since it is difficult to devise solvent systems which will selectively dissolve one metal of a composite without at least partially dissolving the other. The consequent process complications, product purity problems, and cost of chemical separations are thus apparent.

A potential variant of chemical separation is separation by electrochemical processes in which the metal composite serves as an anode and one metal is preferentially removed by application of electrolytic current. However, electrolytic processes in general suffer from the same limitations as wet chemical procedures in that anodic dissolution is not normally selective, especially where the metals of the composite have oxidation potentials which are not substantially different.

SUMMARY OF THE INVENTION

It is an object of the present invention to provide an improved method and apparatus for recovering the metals of a metal composite by substantially quantitative removal of the external layer from its substrate. It is also an object of the present invention to provide such a method in which removal is rapidly, efficiently, and economically accomplished without significant attack, degradation or deterioration of the substrate. It is a further object of the present invention to provide such a method in which the metal of the external layer is recovered in substantially pure form. A particular object of the invention is to provide such a method in which separation is effected by electrochemical means. Other objects and features will be in part apparent and in part pointed out hereinafter.

Briefly, the present invention is directed to a process for separating a first metal from a composite metal body in which said first metal is adhered as an external layer over a substrate constituted by a second metal. In this process, the metal body is immersed in an electrolytic solution in which the two metals are subject to differential anodic dissolution at a predetermined anode voltage measured by reference to a standard electrode, with the degree of dissolution of the second metal in the half-cell comprising the second metal and the solution being substantially less than the degree of dissolution of the first metal in the half-cell comprising the first metal and the solution at the predetermined voltage. Direct current is supplied to the body from the positive terminal of a direct current power source whose negative terminal is connected to a second electrode immersed in the solution, thereby establishing an electrolytic circuit in which the body is the anode and the second electrode is the cathode. The voltage of the anode relative to the standard electrode is controlled at a voltage at which the degree of dissolution of the second metal in the half-cell comprising the second metal and the solution is substantially less than the degree of dissolution of the first metal in the half-cell comprising the first metal and the solution so as to cause selective removal of the first metal from the body. The invention is particularly directed to such a process in which the second metal is palladium and the first metal is silver, gold or an alloy of silver and gold.

The invention also includes apparatus for carrying out the above process. The apparatus includes a container for an electrolytic solution and a direct current power source with a variable output voltage. A cathode is electrically connected to the negative terminal of the power source and means are provided for electrically connecting the positive terminal of the power source to the body so that the body may serve as the anode of an electrolytic circuit. A standard electrode is included for sensing the voltage of the anode, and control means are electrically connected with the anode and the standard electrode. The control means are responsive to the voltage difference between the anode and the standard electrode to control the voltage output of the power source so that the anode voltage is maintained at a level at which, in a particular electrolytic solution, the degree of dissolution of the second metal in the half-cell comprising the second metal and the solution is substantially less than the degree of dissolution of the first metal in the half-cell comprising the first metal and the solution.

DESCRIPTION OF PREFERRED EMBODIMENTS

In accordance with the present invention, it has now been discovered that highly selective removal of the external layer of a metal composite, such as a body of scrap, can be accomplished by controlled potential electrolysis. The feasibility and uniquely advantageous character of this process is based on the phenomenon of differential current densities at the different metals in a given solution at particular voltages measured by reference to a standard electrode such as a saturated calomel electrode. This phenomenon is illustrated by the polarization curves set forth in FIGS. 1 and 2.

At an anode constituted by a particular metal immersed in a particular electrolytic solution, current density generally tends to increase as the absolute potential applied at that anode is made less negative. However, due to the passivity resulting from polarization at certain anode potentials, the current density curve for some metals passes through minima at such potentials. At other voltages, current density maxima may be observed.

Figure 1:
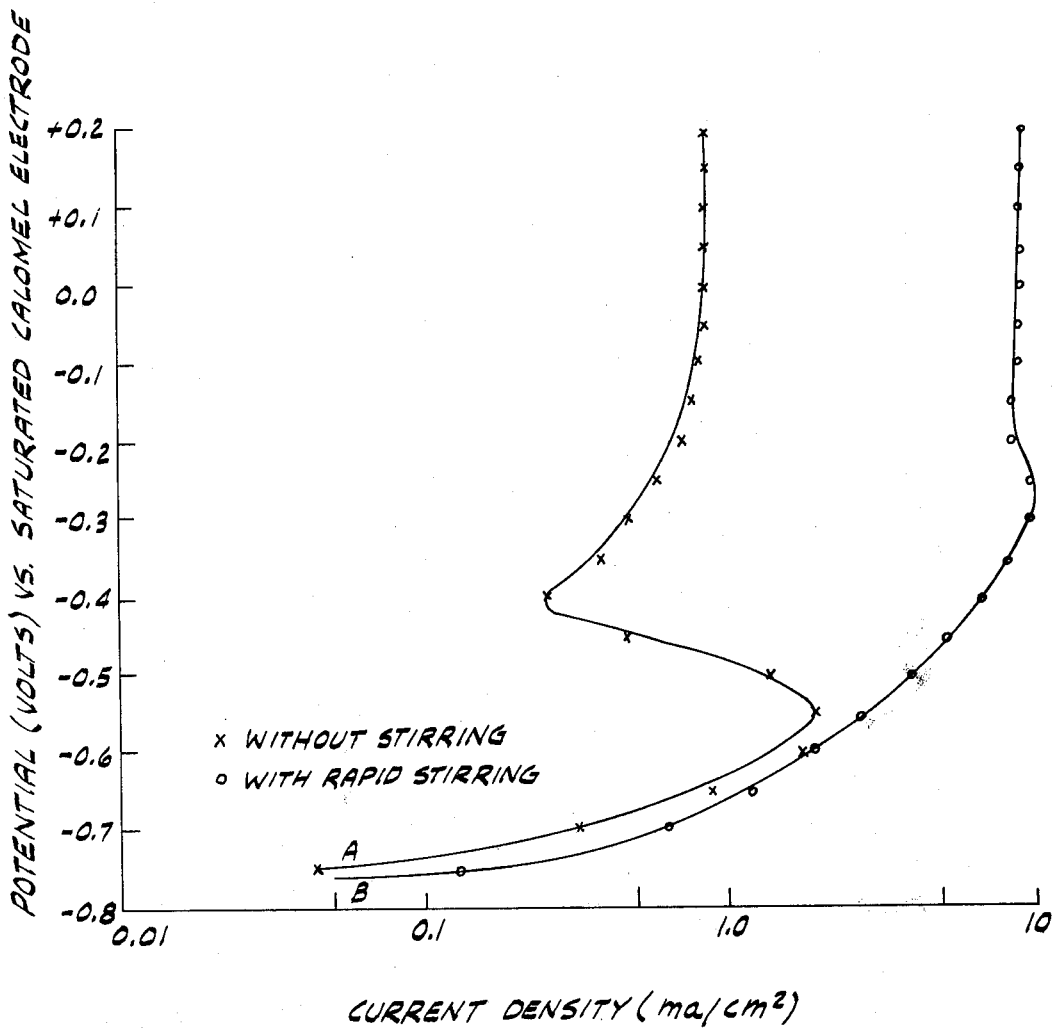
FIG. 1 is a graph illustrating aspects of methods of this invention and showing the polarization curves for an alloy containing 90% gold and 10% silver in 5% sodium cyanide solution at 25°C., with and without stirring.
Figure 2:
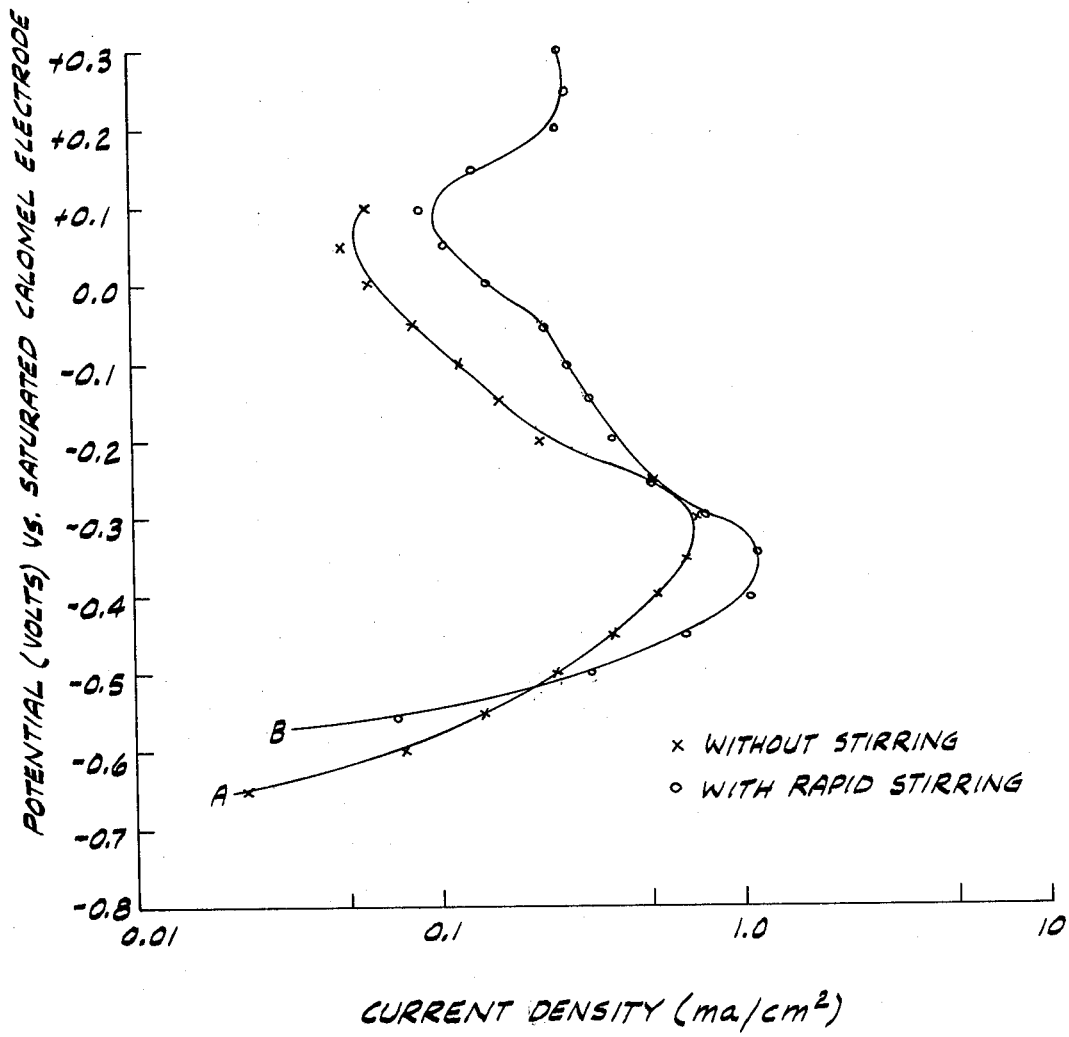
FIG. 2 is a similar graph showing the potentiostatic polarization curves for palladium in 5% sodium cyanide solution at 25°C. with and without stirring.

Minima on the polarization curve are frequently attributable to the formation of passivating films at particular voltages. Diffusion limitations on transport of the reactants and products of the anodic reaction may also contribute to minimum current densities. Such a diffusion limitation is indicated in FIG. 1 where in unagitated 5% sodium cyanide solution, the polarization curve for a 90% gold/10% silver alloy passes through a distinct minimum at approximately -0.4 v relative to the standard calomel electrode but, when the solution is rapidly stirred, no such minimum is observed. Lesser diffusion effects are indicated in FIG. 2 for palladium in 5% sodium cyanide at 25°C.

In the process of the present invention, a composite metal body is immersed in a suitable electrolyte and electrically connected to the positive terminal of a direct current power source. The negative terminal of the power source is connected to a cathode which is also immersed in the electrolytic solution to establish an electrolytic circuit in which the composite metal body is the anode. The cathode is preferably constituted by a material which, in the electrolytic solution utilized, affords a half-cell reaction resulting in the deposition of the metal which is dissolving at the anode. Conveniently, the cathode is constructed of this same metal.

The electrolytic solution utilized is one in which the metals of the composite are subject to differential anodic dissolution at a predetermined anode voltage measured by reference to a standard electrode. The degree of dissolution is determined from the polarization curve for the half-cell comprising a given metal in a given electrolytic solution, with a low degree of dissolution being indicated by a low current density at a particular voltage. Once the identity of the electrolytic solution is established, an operating voltage is selected at which the polarization curves indicate that the current density for the substrate metal is a minimum while the current density for the metal constituting the external layer of the composite is reasonably high. Direct current is supplied to the body from the power source at this anode voltage. For maximum selectivity in anodic dissolution, the ratio between the current densities at the voltage of choice should be as high as possible. It is particularly important that the current density ratio be high where the area of substrate metal exposed to the electrolytic solution exceeds the exposed area of the external layer. A difference between the current densities of two or more orders of magnitude will almost always provide clean separation. Where the exposed area of the external layer exceeds that of the substrate, lower ratios may also provide good separation.

As used in this disclosure, the term "external layer" of a metal composite simply means a layer which is exposed to the electrolytic solution for anodic dissolution. If the metal composite has two layers, the substrate to which the external layer is adhered will normally be exposed to the solution also, but the electrolyte and the voltage are chosen to suppress its dissolution. The composite may also have the substrate sandwiched between two or more cladding layers. It will be understood that, in the present context, the terms "external layer" and "substrate" carry no implication as to which metal was applied to which in the initial preparation of the composite.

To control the voltage during electrolytic separation operations, a standard electrode is immersed in the electrolytic solution in proximity to the anode. The difference between the anode voltage and that of the standard electrode is constantly measured and, in response to this measurement, the voltage output of the power source is controlled to maintain the anode voltage at the predetermined voltage referred to the standard electrode. As a result, selective dissolution of the external layer of the metal composite is obtained.

As anodic dissolution of the external layer proceeds substantially to completion, the current density falls off to a low level and the separation is complete. Essentially quantitative removal of the external layer is thus achieved without significant attack on the substrate. Metal dissolved from the external layer at the anode deposits at the cathode in high purity. Where the cathode initially consists of this same metal, the cathodic product is simply washed and dried, and may then be suitable for use without further purification. Similarly, the denuded anode provides a relatively pure source of the substrate metal. The process of the invention thus provides a simple, direct, rapid and economical method for separation and recovery of the constituent metals of the composite.

Figure 3:
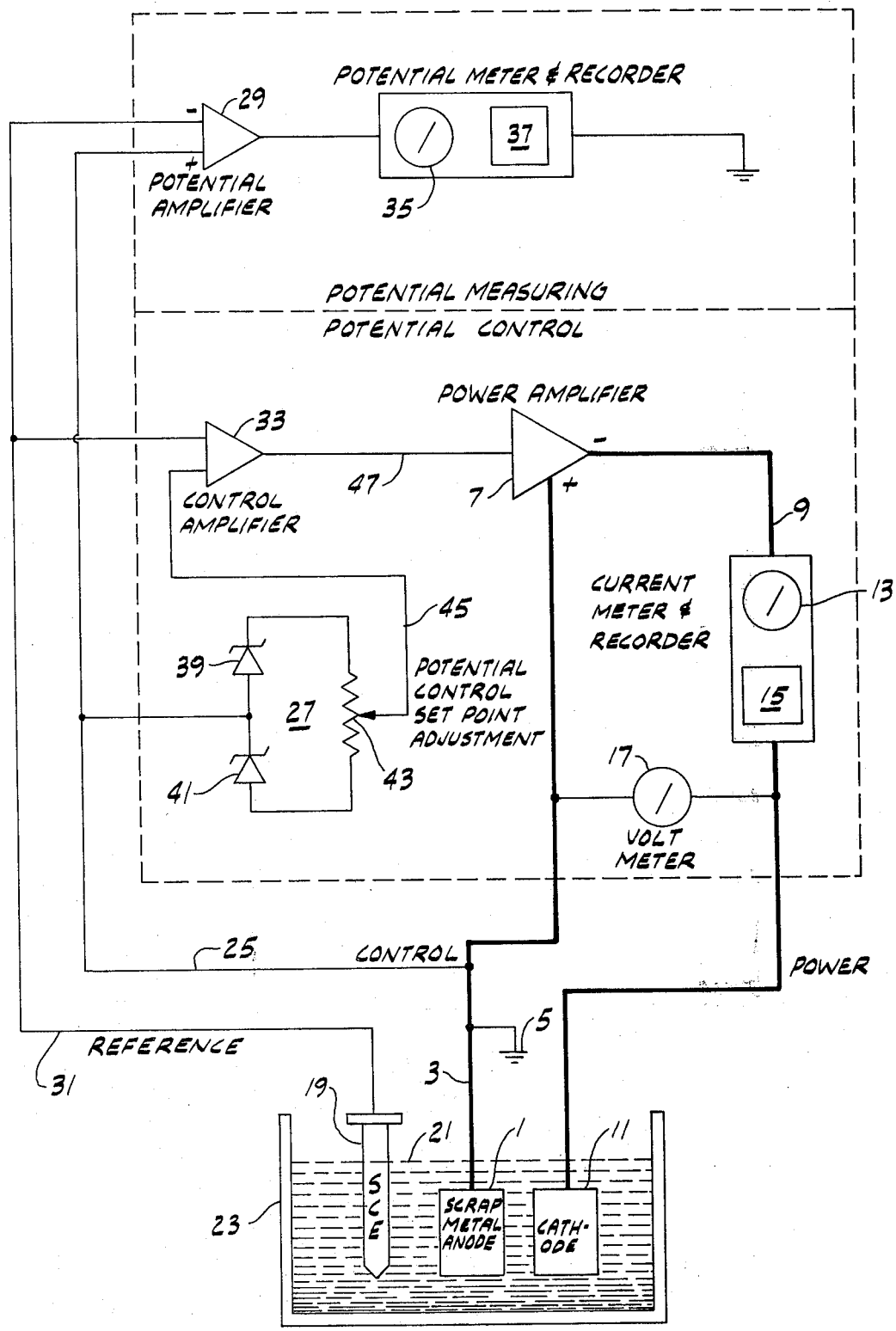
FIG. 3 is a schematic diagram of an apparatus of the instant invention.

Apparatus for carrying out the process of the invention is illustrated in FIG. 3 and includes a potential measuring section and a potential control section. Shown at 1 is an anode constituted by a body of scrap metal composite. Through a lead wire 3, anode 1 is electrically connected to ground as indicated at 5 and to the positive terminal of a direct current power source (power amplifier) 7 which has a controllable variable output voltage. The negative terminal of power source 7 is electrically connected to cathode 11 through a conductor 9, a current meter 13 and a current recorder 15, the latter indicating the rate of electrolysis and power consumption of the electrolytic circuit, while a voltmeter 17 indicates the output voltage level of the power amplifier.

The voltage of anode 1 is sensed by a reference electrode 19 placed in proximity to the anode. Each of the three electrodes is immersed in an electrolytic solution 21 in a container 23. A signal lead 25 transmits the voltage of anode 1 to the input of a potentiometric control device 27 and to the positive input terminal of a potential amplifier 29, while a signal lead 31 interconnects reference electrode 19 to one input terminal of a control amplifier 33 and to the negative input terminal of potential amplifier 29. Potential amplifier 29 thus provides a signal corresponding to an amplified difference in voltage between anode 1 and electrode 19, and this differential voltage is indicated by a potential meter 35 and recorded by a potential recorder 37.

Potentiometric control means 27 comprises a balance circuit including plus and minus temperature compensated zener diode regulated supplies 39 and 41 and a potential control set point potentiometer 43. The other input terminal of amplifier 33 is connected by a lead 45 to the rotor or arm of potentiometer 43. As long as the voltage of an anode 1 differs from the voltage of standard electrode 19 by an amount corresponding to the set point of potentiometric means 27, there will be no input error signal applied to the input of amplifier 33. However, upon the anode voltage straying from the set point the resultant difference between the voltages transmitted by leads 31 and 45 applies an error signal to control amplifier 33 which in turn transmits a control signal through line 47 to power amplifier 7 adjusting the total voltage output of the power source to bring the voltage of anode 1 back to the desired level. When the voltage of the anode becomes too positive relative to the standard, the output voltage of power source 7 is reduced to bring anode 1 back to the control level and, when the voltage of anode 1 becomes too negative, the total output of power source 7 is increased to reestablish the control level.

In a particular useful embodiment of the present invention, gold, silver or a gold/silver alloy is recovered from a composite metal body in which palladium is the substrate and the gold, silver or alloy is the external layer. It has been discovered that an alkali metal cyanide is an especially effective electrolyte for this particular separation. The electrolytic solution preferably employed in gold/silver recovery contains between about 1 and about 10% alkali metal cyanide, approximately 5% by weight sodium cyanide being preferred.

As indicated in FIGS. 1 and 2, selective anodic dissolution of a gold/silver alloy containing 90% gold and 10% silver (X50) can be carried out in 5% sodium cyanide solution at an anode voltage of between about −0.4 v and about +0.1 v referenced to a saturated calomel electrode. A voltage of 0.0 v is preferred.

As further indicated in FIG. 1 by the differences between the current densities with stirring and the current densities without stirring, the anodic dissolution of 90% gold/10% silver alloy in 5% sodium cyanide solution is diffusion limited. As shown in FIG. 2 on the other hand, the passivity of the palladium substrate is so great that diffusion resistances do not have a significant effect on the current densities obtained. As a consequence, it is advantageous to agitate the electrolytic solution in which X50 is removed from palladium so as to enhance both the selectivity and productivity of the separation process. Increasing temperature also increases diffusion rates and reduces diffusion related polarization.

The following examples illustrate the invention.

EXAMPLE 1.

An electrolytic solution was prepared containing 5% by weight sodium cyanide, and 200 ml of this solution was introduced into a container for an electrolytic bath. To obtain the polarization curve of FIG. 1, two electrodes, each consisting of X50 alloy and having a surface area of 10 cm$^2$, were immersed in the electrolytic solution, and a saturated calomel electrode was also immersed in the solution in proximity to the electrode which was to serve as the anode. Controlled voltage was applied to the system using a potentiostat sold under the trade designation TRW Model 200 by TRW Instruments, El Segundo, Calif. The positive power terminal of this potentiostat was connected to the anode and the negative power terminal was connected to the cathode. A lead from the anode was connected to the potential control set point adjustment feedback input in the potential control circuit of the instrument and to the positive terminal of the potential amplifier in the potential measurement section. A lead from a saturated calomel electrode was connected to the control amplifier input terminal in the potential control section and to the negative terminal of the potential amplifier.

With the solution exposed to the atmosphere at a temperature of 25°C., the anode voltage was initially adjusted to −1.0 v relative to the saturated calomel electrode and the current measured. At five-minute intervals thereafter, the voltage was successively increased in 50 mv steps relative to the standard electrode until a voltage of +0.2 v was reached. Current measurements were taken at each intermediate voltage, providing the data from which curve A of FIG. 1 was constructed. The procedure was then repeated with rapid stirring of the electrolytic solution, yielding the data plotted in curve B of FIG. 1.

Substituting palladium electrodes for the X50 alloy electrodes, the same technique was applied to obtain the curves of FIG. 2.

From the polarization curves of FIGS. 1 and 2, an anode voltage of −0.4 v relative to the saturated calomel electrode was selected for a run in which X50 alloy was removed from a palladium substrate. Using the potential control system described above, electrolysis was carried out at ambient conditions in 5% sodium cyanide solution using a 20 cm$^2$ surface area X50 alloy cathode and a 20 cm$^2$ anode consisting of a scrap composite having a palladium substrate and an external layer of X50. The electrolytic solution was stirred constantly during electrolysis. The current density was initially 8 ma/cm$^2$, falling to about 0.2 ma/cm$^2$ at the end of 4 hours when all X50 had been removed from the substrate except for a thin stripe down the center. Analyses of the electrolytic solution and the electrode after run No. 1 are set forth in Table I.

TABLE I

CONTROLLED POTENTIAL ELECTROLYSIS OF X50/Pd SCRAP

| Run No. | Controlled Potential of X50/Pd: Voltage vs. SCE* | Electrolytic Solution Composition µg/ml | | | Cathode Composition % By Weight | | |
|---|---|---|---|---|---|---|---|
| | | Ag | Au | Pd | Ag | Au | Pd |
| 1 | −0.4 | 27 | 250 | 11 | 10 | 90 | 0 |
| 2 | −0.4 | — | — | — | 9.4 | 90.14 | 0.45 |

*Saturated Calomel Electrode

A second run was carried out in the manner described above, again using an anode voltage of −0.4 v. This run was carried to completion in 5 hours and analysis of the anode showed no traces of silver or gold. The initial current density was 10 ma/cm$^2$ and the final current density was 0.22 ma/cm². Analysis of the cathode after run No. 2 is also set forth in Table I.

EXAMPLE 2

Controlled potential electrolysis was carried out with a scrap composite of X50 on palladium as the anode and an X50 cathode. The electrolysis was conducted in the manner described in Example 1, except that the anode voltage was controlled at 0.0 v versus the saturated calomel electrode. After 4 hours, the X50 cladding had been substantially removed and the current density had fallen to 0.05 ma/cm². The anode was maintained at 0.0 v for 4 additional hours to determine the stability of palladium at this potential. After the second 4-hour period, the current density was 0.04 ma/cm² and the palladium did not appear to have been significantly attacked. Analysis of the electrolytic solution at various points in time during the electrolysis is set forth in Table II. Mass spectrometer readings verified that the anode was free of silver and gold after electrolysis was complete.

TABLE II

BATH COMPOSITION DURING ELECTROLYSIS OF X50/Pd SCRAP

| Potential Voltage vs. SCE* | Time Hours | Composition of Electrolytic Solution µg/ml | | | Weight Per cent Cathode Composition | |
|---|---|---|---|---|---|---|
| | | Ag | Au | Pd | (Au+Ag) | Pd |
| 0 | 5.0 | 31 | 413 | 18 | >99.99% | <0.01% |
| 0 | 6.5 | 40 | 502 | 23 | >99.99% | <0.01% |
| 0 | 7.0 | 40 | 528 | 24 | >99.99% | <0.01% |

*Saturated Calomel Electrode

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. A process for separating a first metal selected from the group consisting of gold, silver and alloys of gold and silver from a composite metal body in which said first metal is adhered as an external layer over a substrate constituted by a second metal, the process comprising the steps of:

immersing the body in an electrolytic solution of an alkali metal cyanide in which the two metals are subject to differential anodic dissolution at a predetermined anode voltage measured by reference to a standard electrode with the degree of dissolution of the second metal in the half-cell comprising said second metal and said solution being substantially less than the degree of dissolution of the first metal in the half-cell comprising said first metal and said solution at said voltage;

supplying direct current to said body from the positive terminal of a direct power source whose negative terminal is connected to a second electrode immersed in said solution thereby establishing an electrolytic circuit in which said body is the anode and said second electrode is the cathode; and continuously controlling the voltage of said anode relative to said standard electrode at a level at which the degree of dissolution of the second metal in the half-cell comprising said second metal and the solution is substantially less than the degree of dissolution of the first metal in the half-cell comprising said first metal and the solution thereby causing selective removal of said first metal from said body.

2. A process as set fourth in claim 1 wherein the voltage of said anode is controlled by controlling the voltage output of said direct current power source in response to the difference in voltage between said anode and said standard electrode.

3. A process as set forth in claim 1 wherein said second metal is palladium.

4. A process as set forth in claim 3 wherein said electrolytic solution contains between about 1 and about 10% by weight of an alkali metal cyanide.

5. A process as set forth in claim 4 wherein said solution contains on the order of 5% by weight sodium cyanide.

6. A process as set forth in claim 4 wherein the anode potential is maintained at a level between about −0.4 and about +0.1 volts relative to a saturated calomel electrode.

7. A process as set forth in claim 3 wherein said first metal is deposited at said cathode.

8. A process for separating a first metal selected from the group consisting of silver and gold and alloys of silver and gold from a composite metal body in which said first metal is adhered as an external layer over a palladium substrate, the process comprising the steps of: immersing the body in a solution containing between about 1 and about 10% by weight alkali metal cyanide;

supplying direct current to said body from the positive terminal of a direct current power source whose negative terminal is connected to a second electrode immersed in said solution, thereby establishing an electrolytic circuit in which said body is the anode and said second electrode is the cathode;

continuously agitating said solution; and continuously controlling the voltage of said anode relative to a standard electrode at a level at which the degree of dissolution of the palladium in the half-cell comprising palladium and said solution is substantially less than the degree of dissolution of the first metal in the half-cell comprising said first metal and said solution thereby causing selective removal of said first metal from said body and deposition of said first metal onto said cathode.

9. A process as set forth in claim 8 wherein the voltage of said anode is maintained at a level between about −0.4 and about +0.1 volts relative to a saturated calomel electrode.

* * * * *